United States Patent
Nakai et al.

[15] 3,660,629
[45] May 2, 1972

[54] METHOD AND DEVICE FOR WELDING HIGH TENSILE STRENGTH STEEL OF HIGHER STRENGTH

[72] Inventors: Tuneo Nakai, Takatsuki; Akira Ando, Takarazuka; Setuzi Minehisa, Itami; Shunsuke Kaneko, Neyagawa; Yosinori Siraki, Sakai; Tatuo Inui, Osaka; Hiroyuki Nakazima, Ashiya; Naotugu Tominaga, Sakai, all of Japan

[73] Assignee: Hitachi Shipbuilding & Engineering Co., Ltd., Osaka-shi, Nishi-ku, Japan

[22] Filed: Jan. 2, 1970

[21] Appl. No.: 154

[52] U.S. Cl. ............................................. 219/73, 219/137
[51] Int. Cl. ................................... B23k 9/18, B23k 25/00
[58] Field of Search ........................... 219/73; 148/127

[56] References Cited

UNITED STATES PATENTS 3,293,400 12/1966 Brogdon ........................... 219/73
3,296,412 1/1967 Waite et al. ...................... 219/73 X
3,325,619 6/1967 Tanenbaum ....................... 219/73

Primary Examiner—J. V. Truhe
Assistant Examiner—George A. Montanye
Attorney—Edwin E. Greigg

[57] ABSTRACT

At first to execute a welding of high tensile strength steel of more than 60 kg/mm² an electro-slag welding technique is adapted.

While said electro-slag welding being operated, deposited metal near the molten weld metal and the base metal portion near thereto in hot state are subjected to high speed cooling by liquid so that they may be quenched, thereby to transform the bond structure into a structure comprising martensite and lower bainite or preferably into a martensitic structure.

And then by tempering, said structure comprising martensite and lower bainite is changed into a structure comprising tempered martensite and tempered lower bainite and said martensitic structure is changed into a tempered martensitic structure.

10 Claims, 10 Drawing Figures

METHOD AND DEVICE FOR WELDING HIGH TENSILE STRENGTH STEEL OF HIGHER STRENGTH

BACKGROUND OF THE INVENTION

The submerged welding or the electro-slag welding has been hitherto, considered to have to be avoided in applying to welding thick high tensile strength steel of higher strength because it causes brittleness in welding. Owing to the abovementioned reason, merely the manual welding method has been as far carried into practice in electric welding for this type of steel only under the condition restricting the heat input to minimum, and therefore the process has not only a defect causing inefficiency in working by dint of the slowness of welding speed, but also another defect not immune from causing the brittleness even by the manual method for this high tensile strength steel of higher strength.

Furthermore, it may be stated into detail as following.

In recent years there is a growing tendency to use high tensile strength steel partly because of the necessity to lessen the weight of structure to reduce material and manpower costs and partly because high tensile strength steels of excellent weldability become available and welding technique has been improved. For these reasons, it is desired that steel materials of high strength may be used as much as possible, but the higher the strength, the more are difficulties in welding such steel materials.

With a high tensile strength steel of not more than 60 kg/mm$^2$, heat input has been regarded as not effecting any influence on the embrittlement of the bond irrespective of whether it was provided by manual or auto-electric welding.

The term, "bond," as herein used is defined as follows: It is a minute portion on the side affected by welding heat in the base metal in the region near the boundary between the weld metal and heat affected zone in the base metal.

Regarding a high tensile strength steel of 80 kg/mm$^2$ to 70 kg/mm$^2$ the following facts have been understood: Even the conventional manual welding may be carried into practice only in the condition where a small quantity of heat input is applied, whereas it includes the defect in case of increasing the heat input.

In using the conventional submerged-arc welding, the heat input increases much more with the result of causing embrittlement than in the manual welding, and therefore, the conventional submerged-arc welding can't be applied to practical use at all.

In using the conventional electro-slag welding, owing to the heat input being much higher than in the conventional submerged-arc welding, it causes remarkably embrittlement, and therefore, it cannot be used in practice at all either.

In case of electro-slag welding on high tensile strength steel of 80 kg/mm$^2$ to 70 kg/mm$^2$, on account of high heat input caused by the welding, it has been observed that the bond is remarkably made more brittle compared with that by the manual welding, and, therefore, in case of welding performed on high tensile strength steel of 80 kg/mm$^2$ to 70 kg/mm$^2$, the performance by the electro-slag welding must be, from the viewpoint of embrittlement of the bond, avoided to apply.

The same concept has been held in regard to the submerged arc-welding as well as the electro-slag welding.

The state of the abovementioned embrittlement will be apparent in FIG. 3 aftermentioned, illustrating the results of butt welding operations conducted on high tensile strength steel of 80 kg/mm$^2$ class by conventional manual welding (curve III–1), conventional submerged-arc welding (curve III–2) and conventional electro-slag welding (curve III–3), the results being obtained in the experiments by the present inventors. To carry out the experiments, specimens for tension test relatively large in width as shown in FIG. 2 aftermentioned, were made with several pieces for each type of welding operations, and subjected to static tension test longitudinally of the joints; the tests for each type of the joints being executed in several different constant temperatures respectively.

The dimensions of the specimen were: $II_1 = 170$ mm; $II_2 = 150$ mm; $II_3 = 400$ mm; $II_4 = 800$ mm; and thickness is 38 mm.

The results are shown in FIG. 3.

In FIG. 3, the test temperature (°C) is plotted in the axis of abscissa and the ductile fracture factor (percent) on the fractured surface is plotted in the axis of ordinate. In the case of the conventional manual welding (curve III–1), fracture took place in the base metal even at −80°C., the fractured surface being found to have ductility of 100 percent. With the conventional submerged-arc welding (curve III–2), fracture (100 percent ductility) was was produced in the base metal at 0°C., while brittle fracture (ductile fracture factor, 0 percent) occurred along the bond at −20°C. Further the conventional electro-slag welding (curve III–3) resulted in brittle fracture (ductile fracture factor, 0 percent) along the bond at 0°C. The brittle fracture which took place along the bond at −20°C. in the case of the conventional type submerged-arc welding and at 0°C. in the case of conventional electro-slag welding occurred instantaneously under a load which exceeded the yielding point slightly. And it was found out that such conventional auto-electric welding operations resulted in the formation of upper bainite. Bainite transformed at a comparatively higher temperature within the sphere of temperature in continuous cooling transformation diagram is names as upper bainite, whereas bainite transformed at a comparatively lower temperature is defined as lower bainite. The results of the present inventors' experiments show that the the brittle fracture along the bond was due to the fact that the upper bainite structure had little resistance to the development of brittle cracking. Because of such state, in reviewing every kind of the conventional method of welding, there existed as a matter of fact a drawback that the higher the input of welding heat, the more was generated the bond embrittlement (namely the embrittlement due to the upper bainite. Moreover, the higher was the strength of the high tensile strength steel, the more distinct was the tendency for the bond to be embrittled. Such embrittlement due to the formation of the upper bainite in the bond impaired the reliability of welded steel joints. For the steel materials of this type, therefore, it had been merely suggested to limit the heat input to a certain low level at the time of welding and the improvement of the cooling speed beyond a certain level has been achieved from experience only through such restriction on the heat input; the prevention against the formation of the abovementioned drawback has been only carried into practice by said negative means. This fact shows that the technical method to prevent the drawback accrued from welding of a high tensile strength steel of higher strength has been heretofore absorbed in only minimizing quantity of the heat input. Because of these current of the welding technique and in view of bond embrittlement as forementioned, the application of electro-slag welding to high tensile strength steel of higher strength has been regarded as to have to be avoided by the reason of a great heat input being necessary for this processes.

SUMMARY OF THE INVENTION

From the results of the present inventors' experiments on manual welding which has been considered to be the only one preferable method from the viewpoint of metallurgy and strength in regard to welding high tensile strength steel of higher strength, the present inventors have found out that even the heat input such as in required for manual welding produces upper bainite structure and results in brittle fracture.

This fact can be described in detail as followings. It is a world-wide tendency in the studies of welding that the metallographical researches on the bond of weld have been conducted analogically on the basis of continuous cooling transformation diagram at a maximum heating temperature of 1,350°C. FIG. 1 illustrates continuous cooling transformation diagram, i.e., C.C.T.D., at a maximum heating temperature of 1,350°C. In FIG. 1 the cooling times (sec.) is plotted in the axis of abscissa and the heating temperature (°C) in the axis of ordinate.

The result of test for manually welded joint dealt with the specimen of small dimensions in the conventional type illustrated in FIG. 2 exhibited excellent properties as shown in FIG. 3. Therefore, it has been considered this analogical method in using continuous cooling transformation diagram is substantially sufficient for the study of the whole structure in the portion having a considerable width (for instance, of about 0.5 mm) in a zone affected by heat hitherward from the penetration boundary between the weld metal and the affected zone by heat in the strict sense of the word.

However, against the conventional concept, a very large specimen for tension test as shown in FIG. 5, made of manually welded joint, showed the bad results showing a defect in welding given in FIG. 6 and Table 2 when subjected to tension test on a 4,000-ton tension tester at $-20°C$. The dimensions of the test piece were: $V_1 = 1,000$ mm; $V_2 = 600$ mm, and $V_3 = 400$ mm. As indicated in curve VI-2 in FIG. 6, brittle fracture took place along the bond the moment the load exceeded the yielding point slightly. In FIG. 6 the test displacement (mm) is plotted in the axis of abscissa and the stress ($kg/mm^2$) of the welded joints in the axis of ordinate. As shown in the case, it has been found by the inventors against the conventional concept for the first time that when tested on such a very large specimen as illustrated in FIG. 5, even the manual welding which requires a low welding heat input has a drawback to embrittle the bond for a metallurgical cause.

It may be analogized in the following case that a gap between the conventional concept formentioned and a fact that even the joint by the manual welding brings embrittlement of bond structure has existed up to this time. That is, the fact in which even the manual welding applied to a high tensile strength steel of higher strength has been taken into practice by controlling the quantity of heat input, may be considered to indicate that a remarkable increase of said defect has been avoided by enforcing unconsciously such a practice. Furthermore, upsetting abovementioned conventional concept the present inventors' studies on the brittle fracture phenomenon along the bond have proved that the upper bainite structure (area I-4 in FIG. 1) causing the brittle fracture along the bond of the manually welded joint is present at the portion having a width of about 0.1 to 0.05 mm in a zone affected by heat hitherward from penetration boundary in the strict sense of the word. That is to say, close observation of the penetration boundary in the manually welded joint applied to the test as shown in FIG. 6, had been disclosed by the inventors that, extremely thin as it is (0.1 to 0.05 mm. in thickness), an upper bainite layer which cannot be expected from the continuous cooling diagram appears and that the fracture has occurred at this upper bainite layer. This is the present inventors' first finding.

In spite of the fact that, especially in application to steel materials with greater thickness, electro-slag welding of conventional type is more efficient than manual welding with respect to welding speed, it was regarded as to have to be avoided for the welding of high tensile strength steel of higher strength as already described in "Background of the Invention," so that such steel materials required very inefficient manual welding, which also could not be free of inevitable results undesirable from the viewpoint of metallurgy and strength as previously explained. In an attempt to overcome these defects and to ensure rapid and excellent welding operation the present inventors have accomplished the present invention.

The inventors considered that the presence of a gap between the conventional concept and the fact formentioned had based on the following reason. With a welding process which employs arc as a welding heat source, the boundary between the melted and unmelted portions, when the base metal is melted by arc, is subjected to high arc temperature (about 4,000° to 6,000°C.) and, at the same time, to arc plasma atmosphere which is chemically very active, so that presumably alloy elements become highly active chemically in the very thin surface layer in the unmelted portion of the base metal.

Analogyzing the bond portion exposed to such a high temperature as about 4,000°C. to 6,000°C. only by the continuous cooling transformation diagram at the maximum heating temperature of 1,350°C. may be considered as making the analogy erroneous. The present inventors, therefore, considered that research for such portion at the time of welding should further include the temperature grade and chemical properties of welding atmosphere at the time of welding in each method of welding respectively.

The present inventors noticed that, in case of the electro-slag welding which utilized Joulean heat of the molten slag as the heat source, the temperature of the molten slag being merely about 1,800°C. much lower than 4,000°C. to 6,000°C. of the arc welding and the boundary between the molten and unmolten portions of the base metal being in contact with the molten slag, the chemical activity of the alloy ingredients in this portion was lower as compared with the arc atmosphere, and, therefore, a structure analogically inferred from the continuous cooling transformation diagram in FIG. 1 could be obtained in a formula along the penetration boundary as the bond structure in electro-slag welding.

Upsetting the conventional concept in the art, the present inventors have established new auto-electric welding methods able to accomplish welding thick high tensile strength steel of higher strength with high speed and easiness by combination of following two kinds of new technique. The first new technique, which upsets the conventional concept considering the electro-slag welding to have to be avoided in use for high tensile strength steel of higher strength because of a large quantity of the heat input, adopts the electro-slag welding in use for high tensile strength steel of higher strength against said conventional concept, and yet adopts it in one hand in order to weld easily with a remarkable rapidity taking rather advantage of the large quantity of the heat input, in other hand in order to prevent arc plasma atmosphere of high temperature from generating by means of using electro-slag welding maintaining mere low temperature in spite of said large quantity of the heat input.

The second new technique: which upsets the conventional concept which considers the embrittlement imperative in case of the electro-slag welding being applied to high tensile strength steel of higher strength, cools the deposit very near the molten weld metal directly at high speed with the use of a cooling liquid while executing the welding so as to transform the bond structure into a structure comprising martensite and lower bainite not containing upper bainite as well as to prevent the growth of the latter or preferably into only martensite structure, in spite of the large quantity of the heat input attributable to the electro!-slag welding, and then tempers to transform said structure comprising martensite and lower bainite into a structure comprising tempered martensite and tempered lower bainite or said martensite structure into tempered martensite structure.

Generally speaking, the present inventors have found out a method to make more rapid and better auto-electric welding for a high tensile strength steel of higher strength possible, wherein a welding effect with more strength can be obtained by adopting a technique of the electro-slag welding having lower generating temperature in place of the arc welding not set free from the generation of high temperature and the plasma of high temperature, and by rapidly cooling the deposited metal and the base metal adjacent thereto with a liquid, together with a temper treatment immediately after the process, and furthermore, by using a great quantity of generating heat in the electro-slag welding, more rapid and easier auto-electric welding for a high tensile strength steel of high strength can be achieved.

In short, though employing electro-slag welding process, the inventors intended to obtain the above-mentioned structure and have successfully obtained the result as intended by carrying out experiments for obtaining rapid, efficient and good welding methods. This is the present inventors' second finding.

Thus it has been found possible to apply to high tensile strength steel of higher strength with welding which is more excellent in metallurgy, strength and speed than the conventional manual welding operation which is the object of the first finding. This is the present inventors' third finding.

Furthermore, the present inventors found that the proportion at which side plates for electro-slag welding are heated by the heat input is about 5 percent of the total heat input and heat transfer to the side plates is small. The inventors, therefore, considered that this attributed to a fact in which, since the slag had a high melting point, a solidified slag layer was formed between the side plates and the deposit, and the heat transfer to the side plates was prevented by the low heat conductivity.

By a method of pouring a cooling liquid directly on the welding portion and forcing the cooling liquid to absorb the heat of vaporization from the deposit and the base metal near thereto, the inventors have found that a readily rapid cooling can be effected, which is not known at all in the conventional technique in the electro-slag welding wherein cooling has been applied only to the inside of the side plates. (See curve I-9 in FIG. 1)

Furthermore, it has been found that the cooling liquid might be sprayed on the surface of deposit and the base metal near thereto or on the slag on the deposit and the base metal near thereto, or on the said surface of deposit and the base metal near thereto while the slag layer right under the side plate is being removed in cooling process. As a means of rapid and powerful cooling to form the structure comprising martensite and lower bainite or preferably only the martensite structure, this method may be regarded as that readily carried into practice and an effective means. This is the present inventors' fourth finding.

Thus the inventors have accomplished the present invention which is a novel method of effecting rapid and wxcellent welding on high tensile strength steel of higher strength.

The fact that with all its distinguished advantages such as high welding speed and efficiency, and outstanding results obtained, the present invention has not heretofore been practised in the art, gives full proof that this invention has never been obvious to those skilled in the art.

One of the objects of the present invention is to provide a method for welding high tensile strength steel of higher strength rapidly and satisfactorily from the viewpoint of metallurgy and strength. Another object of the present invention is to provide a method being capable of easily effecting rapid and excellent welding particularly on high tensile strength steel of higher strength which has a large thickness.

More particularly, the present invention contemplates to provide a method which is an improvement over the electro-slag welding process and which is capable of achieving effective rapid cooling with extreme ease to thereby inhibit the formation of upper bainite. Another object of the invention is to provide an auto-electric welding device suitable to the above-mentioned method. A further object lies in procuring a method of better automatic welding in intensity than by the conventional ordinary manual welding.

Another object of the present invention is to provide a side plate structure by which the method set forth above can be practised with readiness.

Still another object of the present invention is to provide a side plate which employs water as a liquid for rapid cooling and which is yet capable of easily preventing adverse influence on the weld metal.

DESCRIPTION OF THE PREFERRED EMBODIMENTS

EMBODIMENT I

Figure 7:
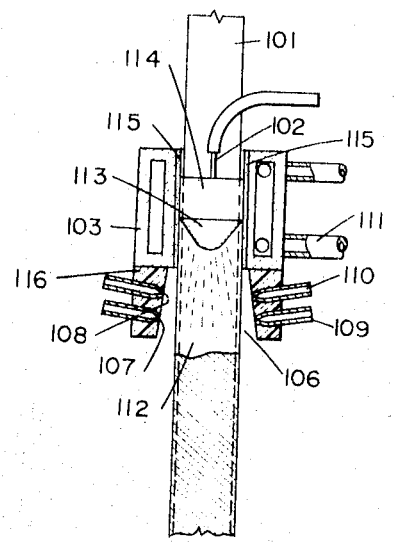
FIG. 7 is a vertical sectional view of a device cut in the middle while operating welding work showing welding operation in accordance with the electro-slag welding process of the present invention.
Figure 8:
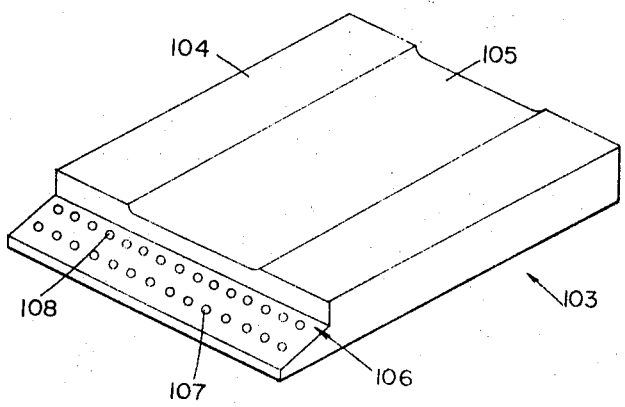
FIG. 8 is a perspective view showing a side plate in FIG. 7.

This embodiment is one mode of the welding methods including the present invention shown in FIG. 7 as it is applied to welding for high tensile strength steel of higher strength. Designated at 101 is a metal plate to be welded; at 102, a welding wire; at 103, side plates made of carbon and disposed on the both sides of the welding portion for preventing escape of molten weld metal, the side plates being adapted to be moved upward as welding proceeds. As shown in FIG. 8, each of the side plates 103 is formed with a longitudinal groove 105 in its inner surface 104 and the lower end of the inner surface 104 is provided with a cut-out portion 106 which extends over the entire width of the side plate 103. Suitably spaced apart in the cut-out portion 106 over the entire width of the side plate 103 are ejecting holes 107 for cooling liquid and ejecting holes 108 for gas. The gas ejecting holes 108 is provided in the side plate 103 at a position closer to molten weld metal pool 113 than to said cooling liquid ejecting holes 107, and the gas ejecting holes 108 are disposed above the cooling liquid ejecting holes 107 which are connected to cooling liquid supply ducts 109 for discharging cooling liquid, the gas ejecting holes 108 being connected with inert gas supply ducts 110. Shutting off means comprise said gas ejecting holes 108 and gas supply ducts 110. The portion providing the ejecting holes 107, 108 is joined with the side plate with a material of low thermal conductivity 116 disposed therebetween so as to prevent the cooling liquid from being heated by the heat generated upon welding. Indicated at 111 is a cooling liquid jacket for cooling the side plate 103. The side plate is applied with mold paint on the inner surface thereof to protect it from wearing off. A mold paint of glass type such as silica, if applied, may also serve as slag. Designated at 114 is molten slag.

While welding operation proceeds, cooling liquid, for example, water, is poured from the ejecting holes 107 onto the deposited metal portion 112 right under the side plate to force the cooling liquid to absorbe a large amount of latent heat upon vaporization, the deposited metal portion 112 thereby being subjected to efficient rapid cooling so that a great extent of portion near the welded part may not undergo reduction in toughness due to grain coarsening. The inert gas discharged from the gas ejecting holes 106 forms a gas curtain immediately above the water ejected portion to prevent the upward current of steam generated from the cooling water, the gas curtain thus serving to preclude the adverse influence to be otherwise exerted on the quality of the molten weld metal in the pool 113 upon the steam reaching the molten metal pool 113. In case of this embodiment, the cooling liquid ejecting holes 107 can readily be disposed very close to the deposited metal portion 112 which has just been formed upon welding, so that good effect by high speed cooling can be achieved. The gas ejection in this mode of embodiment, in addition to the sealing effect provided by the gas curtain, also ensures outstanding cooling effect.

The results of experiments carried out in accordance with the present method will be described below.

Welding operations were performed on high tensile strength steel, 80 kg/mm$^2$, with a thickness of 50 mm. under welding conditions of current: 580 –620 amp.; voltage: 34 volts; welding speed: about 2.0 cm/min.

Figure 1:
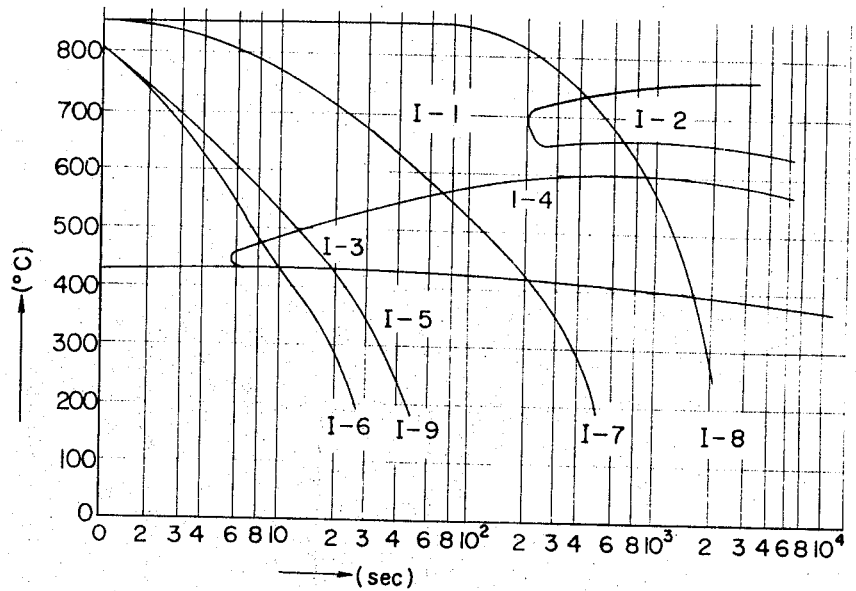
FIG. 1 is a continuous cooling transformation diagram containing cooling curve showing the results of conventional welding and of present invention method performed on high tensile strength steel of 80 kg/mm² class.
Figure 2:
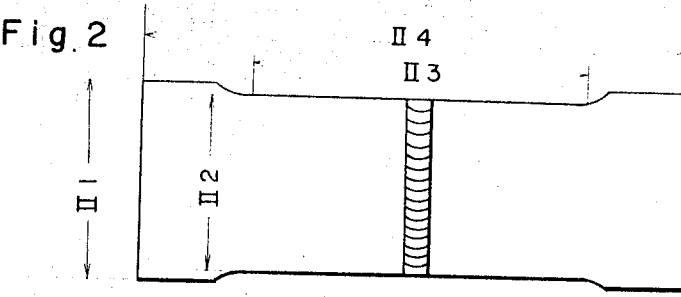
FIG. 2 is a plan view showing the dimensions of a specimen for tension test of the weld of the high tensile strength steel of 80 kg/mm².
Figure 3:
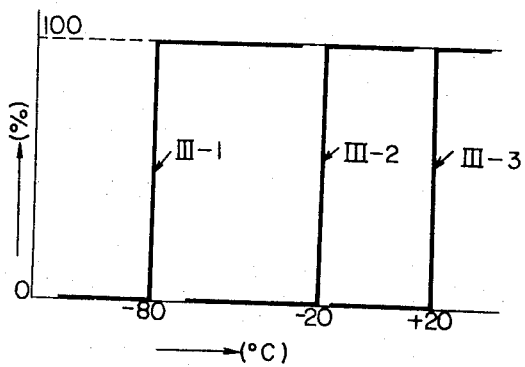
FIG. 3 is a diagram showing the relationship between the temperature of tension test and ductile fracture factor obtained by testing the specimens in FIG. 2 welded in conventional manner.
Figure 4:
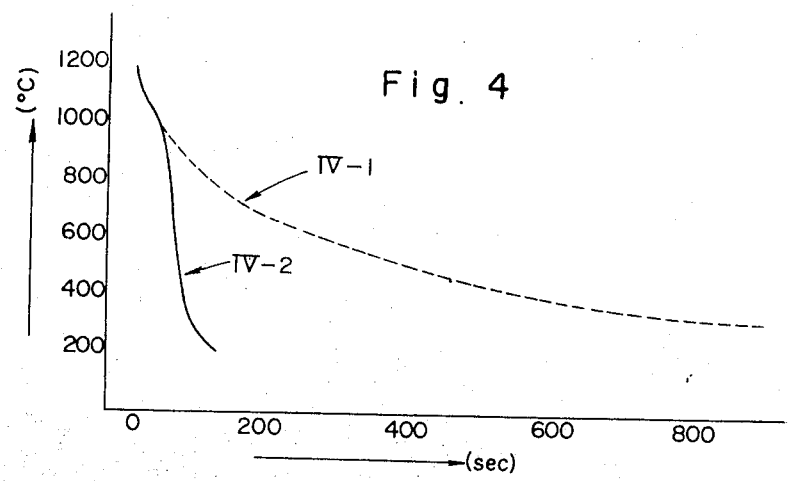
FIG. 4 is a comparison diagram presenting cooling curves of the welds of electro-slag welding when they are subjected to conventional unrestricted cooling and to simultaneous rapid water cooling in accordance with the present invention.

The result of conventional electro-slag welding (unrestricted cooling) is indicated in dotted line (curve IV–1) in FIG. 4 and in curve I–8 in FIG. 1, while the present embodiment of this invention, carried out while supplying cooling water to the portion right under the side plates at a rate of 4 liters/min. during welding operation, showed the result represented by the solid line (curve IV–2) in FIG. 4 and by curve I–9 in FIG. 1. The time required to effect cooling from 800°C. to 300°C. was 35 seconds in the case of water-cooling. It was found that the bond structure was transformed into a structure comprising martensite (area I–5) and lower bainite (area I–3) by cooling effected with water at the abovementioned cooling speed. Since conventional electro-slag welding employs spontaneous cooling, the transformation of micro structure in the vicinity of the bond will be explained with reference to the continuous cooling transformation diagram (FIG. 1). In FIG. 1, the maximum heating temperature is 1,350°C. As indicated in curve I–8, transformation of austenite (area I–1) into ferrite (area I– 2) takes place at about 730°C., untransformed austenite is then transformed into upper bainite (area I–4) at about 600°C. and untransformed austenite is changed into martensite (area I–5) at about 400°C. Said area I–4 is subjected to high temperature zone within the sphere of temperature at which the steel structure is transformed into the bainite.

In case of conventional manual welding with unrestricted cooling, the cooling rate is achieved approximately along curve 1–6 and transformation of austenite (area I–1) into lower bainite (area I–3) is initiated at about 470°C., austenite (which has not been changed into bainite) is transformed into martensite (area I–5) at about 430°C. to form a structure comprising lower bainite (about 34 percent) and martensite (about 66 percent) after cooling.

Conventional submerged-arc welding with unrestricted cooling results in cooling rate approximately along a curve I–7, in which case it is noted that austenite (area I–1) begins to transform into upper bainite (area I–4) at about 560°C., transformation of untransformed austenite into martensite (area I–5) taking place at about 415°C. to produce a structure consisting of upper bainite (about 79 percent) and martensite (about 21 percent).

TABLE 1

Cooling Diagram and Micro Structure

| Cooling Diagram | Welding Condition | Micro Structure |
| --- | --- | --- |
| FIG. 1 Curve I–6 | Conventional Manual Welding | Bainite (34%) Martensite (66%) |
| FIG. 1 Curve I–7 | Conventional Submerged-Arc Welding | Bainite (79%) Martensite (21%) |
| FIG. 1 Curve I–8 | Conventional Electro-Slag Welding | Ferrite (27%) Bainite (59%) Martensite (14%) |

As described above, the bond structure remarkably differs in accordance with the types of welding process and welding conditions. Of these structures, the upper bainite is the most brittle. Since high tensile strength steel of higher strength includes a great amount of this upper bainite, conventional manner of electro-slag welding with unrestricted cooling results in the most serious drawback as compared with other processes. While bainite, like pearlite, is a structure which consists essentially of ferrite and carbide, the fact that the upper bainite is brittle is attributable to the brittleness of the ferrite grains which constitute the structure. In spite of the general concept in the art that welding of high tensile strength steel of higher strength must be avoided from electro-slag welding because otherwise such welding process results in a large heat input and produces formation of undesirable upper bainite, the present inventors, upsetting such conventional concept, have employed the electro-slag welding process for welding of high tensile strength steel of higher strength in combination with effective high speed cooling achieved by pouring liquid directly upon the deposit metal near the molten weld metal so as to avoid formation of the upper bainite which develops the abovementioned defect.

Figure 5:
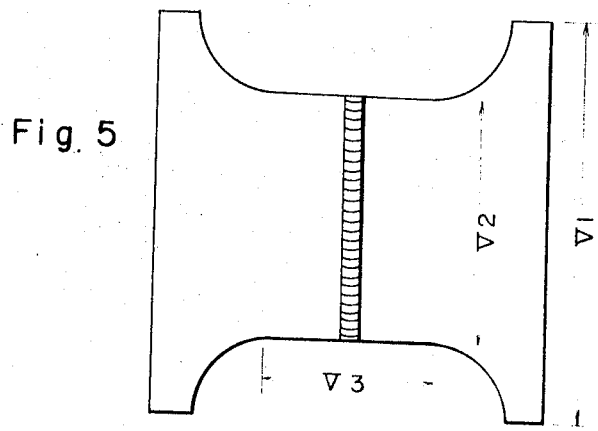
FIG. 5 is a plan view showing the dimensions of a large-size specimen of welded joint for tension test.
Figure 6:
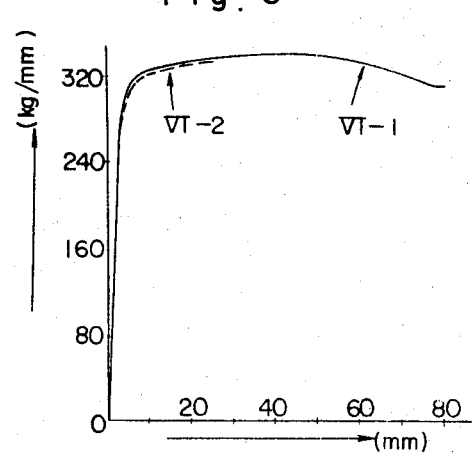
FIG. 6 is a stress-strain diagram, presented for comparison, of the welded joints of the present invention and the conventional manual welding, the diagram being obtained by performing tension test on the specimen shown in FIG. 5.

Next, after being subjected to electro-slag welding process under the abovementioned liquid-cooling condition, the entire welded joint was tempered at 575°C. and was made into very large specimen for tension test shown in FIG. 5. The tension test was conducted at –20°C. on a with the use of a tension tester, 4,000 tons in capacity, The results are represented by the solid line (curve VI–1) in FIG. 6 and Table 2.

TABLE 2

| | Yielding Point (kg./mm.$^2$) | Tensile Strength (kg./mm.$^2$) | Elongation (GL=350) | State of Fracture |
| --- | --- | --- | --- | --- |
| Welded Joint of the Invention | 78.0 | 85.0 | 18 % | Ductile fracture in base metal |
| Manually Welded Joint of Conventional Method | 73.4 | 79.8 | 4.5% | Brittle fracture in bond |

It will be seen that curve VI–1 passes the yielding point, extends further beyond work hardening zone, maximum loading point. After the specimen showed sufficient reduction of section, complete ductile fracture thereafter took place at a base metal portion. On the other hand, the specimen obtained from the welded joint of conventional manual welding process, as indicated in dotted line curve VI–2 in FIG. 6, underwent brittle fracture along the bond the moment the yield point has been passed over slightly. From this comparison, the bond of the welded joint of the present invention is provided to be of properties superior to that obtained by the conventional manual welding. From the foregoing description, it will be apparent that the joint obtained by the present invention has no upper bainite layer of whatever thickness along the penetration boundary in spite of comprising electro-slag welding technique, the fact indicating the outstanding property of the bond attributative to the present method. That is to say, electro-slag welding with increased cooling speed which is secured by subjecting the welded portion right under the side plates to high speed water-cooling in the manner shown in FIG. 7 can form the welded bond portion with a structure comprising martensite and lower bainite without resulting in upper bainite formation in the bond portion and, then by tempering, with a structure comprising tempered martensite and tempered lower bainite. In accordance with the invention thus provided, satisfactory welding operation can be readily performed with a very simple apparatus. Although the present invention employs electro-slag welding with high heat input which has so far been considered to be avoided for the high tensile strength steel of higher strength, it is capable of providing welded joints with extreme ease and high reliability which are more excellent than those produced by conventional manual or submerged-arc welding.

Next, by applying to a high tensile strength steel of 80 kg/mm² with 30 mm. thickness this welding method under the same condition as that forementioned, a bond structure of said high tensile strength steel could be transformed into a tempered martensite structure.

EMBODIMENT 2

Figure 9:
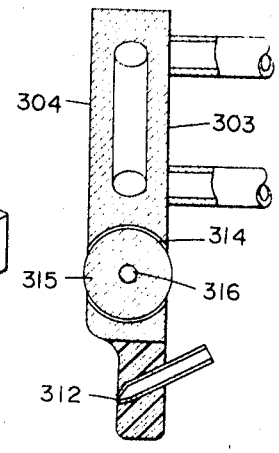

The embodiment shown in FIG. 9 provides a side plate for electro-slag welding presented in the foregoing Embodiment 1. The side plate 303 is provided, at the lower end in the inner surface 304, with ejecting holes 312 for cooling liquid which are suitably spaced apart over the entire width of the side plate 303. Above the ejecting holes 312, the side plate 303 is formed with a space 314 for sealing means in which a seal roll 315 such as an asbestos soft roll serving as the sealing material is rotatably mounted on a horizontal pin 316 over the almost entire width of the side plate 303, the seal roll 315 being so disposed as to be slightly projected from the inner surface 304 of the side plate 303.

When the side plate 303 is moved upward during welding operation, the seal roll 315 is also moved upward while being rotated in fitting contact with the deposited metal or slag surface. In this state, the cooling liquid from the ejecting holes 312 is discharged, under the seal roll 315, against the deposited metal portion which has just been welded to subject the deposited metal to high speed cooling. Being prevented from flowing upward by the seal roll 315, the steam generated from the ejected cooling liquid does not exert adverse influence on the auality of the molten metal in the pool which would otherwise be exercised if the steam should reach the molten metal pool.

EMBODIMENT 3

In this embodiment a gas such as air is discharged from the gas ejecting holes 108 as shown in FIG. 7, the ejecting holes this serving as means for removing the slag layer in cooperation with the liquid ejecting holes 107. The slag layer is therefore removed as it is crushed to pieces by rapid cooling and blown away by the gas. After the slag layer has been removed the deposited metal and the base metal near, thereto are directly subjected to the spray of the cooling liquid to effect efficient cooling operation.

This inert gas employed in means for sealing off the vapour may also serve this purpose.

EMBODIMENT 4

Figure 10:
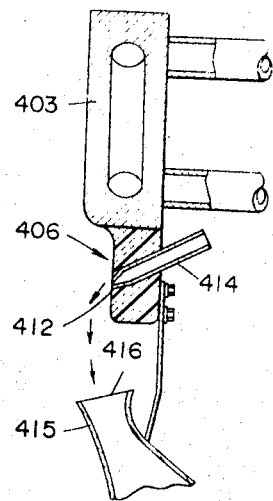
FIG. 9 and FIG. 10 are side views of parts cut in section showing other side plate respectively.

The embodiment shown in FIG. 10 provides a side plate which is used in electro-slag welding operation disclosed in the Embodiment 1 above. A side plate 403 is provided, at a cutout portion 406 in the lower end thereof, with ejecting holes 412 for cooling liquid which are suitably spaced apart over the entire width of the side plate 403. These cooling liquid ejecting holes 412 are respectively connected with liquid supply ducts 414 for ejecting the liquid. The cooling liquid ejecting holes 412 are joined to the side plate 403 with a heat-insulating material disposed therebetween so that the cooling liquid discharged therefrom is prevented from vaporization before ejection due to the welding heat. Suitably spaced apart from and below the lower end of the side plate 403 is a vapor sucking pipe 415 whose vapour sucking open end 416 is directed approximately to the position where the ejected liquid from the holes 412 is vapourized upon cooling and deposited metal portion so as to suck the vapour generated. Thus, the vapour is prevented from flowing upward and therefore from reaching the molten metal pool to exert adverse influence upon the quality of the molten metal.

What is claimed is:

1. A method of welding quenched and tempered high tensile strength steel in excess of 60 kg/mm² to prevent upper bainite structure from forming in the bond portion comprising the steps of:
   A. cooling the deposited metal produced by an electro-slag welding process and the base metal near thereto at high speed by means of liquid and at such rate that
   B. the bonded product produced is transformed into at least one of a structure including martensite and a structure including martensite and lower bainite and not including upper bainite, and tempering the resultant structure.

2. A method as claimed in claim 1 including the further step wherein the cooling is achieved by pouring liquid onto the base metal adjacent to the weld area whereupon vaporization absorbs heat from the deposited metal.

3. A method as claimed in claim 2 including the further step wherein the cooling is achieved by pouring liquid on the deposited weld metal and thereupon removing the resultant slag.

4. A method as claimed in claim 2, including the further step of preventing vapor emanating upon the pouring of the liquid onto the base metal adjacent to the weld area from flowing onto the molten weld metal surface.

5. A method as claimed in claim 4 including the further step wherein an inert gas curtain is formed between the pouring liquid and the molten weld metal, thereby preventing the said vapor from flowing onto the molten weld metal surface.

6. A method as claimed in claim 5, including the further step wherein the inert gas is emitted to the weld metal prior to introduction of the cooling liquid to the base metal.

7. A method as claimed in claim 4, wherein the cooling liquid is applied onto the base metal from one direction with respect to the molten weld metal and the vapor created thereby is sucked away in a direction opposite thereto also with respect to the molten weld metal, thereby preventing the vapor from flowing onto the molten weld metal surface.

8. A method as claimed in claim 3, comprising the further step of preventing vapors emanating from the pouring of the liquid onto the deposited weld metal and slag from flowing onto the molten weld metal surface.

9. A method as claimed in claim 8, wherein said vapors are prevented from flowing onto the molten weld metal surface by a curtain of an inert gas.

10. A method as claimed in claim 1, wherein the cooling speed is greater than the speed represented by a cooling curve passing the intersection of the bainite transformation starting line with the level line of 500° C. shown in the continuous cooling transformation diagram for the base metal.

* * * * *